(12) United States Patent
Soriaga et al.

(10) Patent No.: US 9,214,999 B2
(45) Date of Patent: Dec. 15, 2015

(54) APPARATUS AND METHOD FOR ADAPTIVE RECEIVE DIVERSITY USING LINK QUALITY IN WIRELESS COMMUNICATIONS

(71) Applicant: QUALCOMM Incorporated, San Diego, CA (US)

(72) Inventors: Joseph B. Soriaga, San Diego, CA (US); Jun Hu, San Diego, CA (US); Christopher Gerard Lott, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/939,011

(22) Filed: Jul. 10, 2013

(65) Prior Publication Data
US 2015/0017940 A1    Jan. 15, 2015

(51) Int. Cl.
H04B 7/08      (2006.01)
H04B 1/10      (2006.01)

(52) U.S. Cl.
CPC ............ *H04B 7/0802* (2013.01); *H04B 1/1027* (2013.01); *H04B 7/0877* (2013.01)

(58) Field of Classification Search
None
See application file for complete search history.

(56) References Cited

U.S. PATENT DOCUMENTS

| | | | |
|---|---|---|---|
| 8,160,648 B2 | 4/2012 | Ulupinar et al. | |
| 2003/0156561 A1* | 8/2003 | Padovani | H04B 7/0814 370/335 |
| 2003/0162519 A1* | 8/2003 | Smith | H04B 7/0413 455/277.1 |
| 2005/0197080 A1* | 9/2005 | Ulupinar | H04B 7/0877 455/135 |
| 2006/0023669 A1 | 2/2006 | Yamaura et al. | |
| 2008/0220819 A1* | 9/2008 | Ben-Eli | H04B 7/0874 455/561 |
| 2009/0168914 A1* | 7/2009 | Chance | H04B 1/403 375/267 |
| 2009/0180402 A1* | 7/2009 | Lindoff | H04L 5/16 370/277 |
| 2009/0196196 A1* | 8/2009 | Ghosh | H04L 5/0044 370/252 |
| 2009/0279631 A1* | 11/2009 | Chen | H04L 1/0631 375/267 |
| 2010/0130219 A1* | 5/2010 | Cave | H04W 72/02 455/450 |
| 2012/0120860 A1* | 5/2012 | Chui | H04B 1/711 370/311 |

(Continued)

FOREIGN PATENT DOCUMENTS

| | | |
|---|---|---|
| WO | WO-2013063116 A1 | 5/2013 |
| WO | WO-2013101680 A1 | 7/2013 |

OTHER PUBLICATIONS

International Search Report and Written Opinion—PCT/US2014/045376—ISA/EPO—Oct. 31, 2014.

*Primary Examiner* — Chi H Pham
*Assistant Examiner* — Vladislav Agureyev
(74) *Attorney, Agent, or Firm* — Loza & Loza LLP

(57) ABSTRACT

Aspects of the present disclosure relate to apparatuses and methods for performing adaptive receive-diversity (RxD) to improve power consumption using multiple antennas/receivers. In one aspect, a first receive-diversity (RxD) state is enabled at an access terminal utilizing two receive chains for a communication link. Link quality metrics corresponding to the communication link are determined. The access terminal selectively switches from the first RxD state to a second RxD state utilizing three or more receive chains dependent upon the link quality metrics, such that the energy per bit of the second RxD state is more energy efficient than the energy per bit of the first RxD state.

40 Claims, 13 Drawing Sheets

(56) References Cited

U.S. PATENT DOCUMENTS

| | | |
|---|---|---|
| 2012/0257523 A1 | 10/2012 | Kasturi et al. |
| 2012/0259624 A1 | 10/2012 | Anandakumar et al. |
| 2012/0287815 A1 | 11/2012 | Attar |
| 2013/0064151 A1 | 3/2013 | Mujtaba et al. |
| 2013/0288624 A1* | 10/2013 | Mujtaba ............... H04B 7/0817 455/140 |
| 2014/0098694 A1* | 4/2014 | Damji ............... H04W 52/0229 370/252 |

\* cited by examiner

APPARATUS AND METHOD FOR ADAPTIVE RECEIVE DIVERSITY USING LINK QUALITY IN WIRELESS COMMUNICATIONS

TECHNICAL FIELD

Aspects of the present disclosure relate generally to wireless communication systems, and more particularly, to wireless communication systems using multi-antenna adaptive receive diversity.

BACKGROUND

Wireless communication networks are widely deployed to provide various communication services such as telephony, video, data, messaging, broadcasts, and so on. Such networks, which are usually multiple access networks, support communications for multiple users by sharing the available network resources. As demand for mobile broadband access continues to increase, research and development continue to advance 3G technologies not only to meet the growing demand for mobile broadband access, but to advance and enhance the user experience with mobile communications.

As networks become denser and interference limited, gains from interference suppression can be significant. Additional receive chains and the additional baseband processing needed for full equalization, however, will increase power consumption. If the data activity is very infrequent, enabling diversity chains during periods where there are no or few packets to be demodulated is particularly wasteful and drains limited power resources.

BRIEF SUMMARY OF SOME SAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to apparatuses and methods for performing adaptive receive-diversity (RxD) to improve power consumption using multiple antennas/receivers. In one aspect, the disclosure provides a method for controlling receive diversity in a wireless communication network. The method includes: enabling a first receive-diversity (RxD) state at an access terminal utilizing two receive chains for a communication link; determining link quality metrics corresponding to the communication link; and selectively switching from the first RxD state to a second RxD state utilizing three or more receive chains (or antennas) dependent upon the link quality metrics, such that the energy per bit of the second RxD state is more energy efficient than the energy per bit of the first RxD state.

Another aspect of the disclosure provides an apparatus capable of receive-diversity for a wireless communication network. The apparatus includes: means for enabling a first receive-diversity (RxD) state utilizing two receive chains for a communication link; means for determining link quality metrics corresponding to the communication link; and means for selectively switching from the first RxD state to a second RxD state utilizing three or more receive chains dependent upon the link quality metrics, such that the energy per bit of the second RxD state is more energy efficient than the energy per bit of the first RxD state.

Another aspect of the disclosure provides a computer program product, including a computer-readable storage medium that includes code for causing an access terminal to: enable a first receive-diversity (RxD) state utilizing two receive chains for a communication link; determine link quality metrics corresponding to the communication link; and selectively switch from the first RxD state to a second RxD state utilizing three or more receive chains dependent upon the link quality metrics, such that the energy per bit of the second RxD state is more energy efficient than the energy per bit of the first RxD state.

Another aspect of the disclosure provides an apparatus capable of receive-diversity for a wireless communication network. The apparatus includes at least one processor, a communication interface coupled to the at least one processor, and a memory coupled to the at least one processor. The at least one processor is configured to: enable a first receive-diversity (RxD) state utilizing two receive chains for a communication link; determine link quality metrics corresponding to the communication link; and selectively switch from the first RxD state to a second RxD state utilizing three or more receive chains dependent upon the link quality metrics, such that the energy per bit of the second RxD state is more energy efficient than the energy per bit of the first RxD state.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure relate to apparatuses and methods for performing adaptive receive-diversity (RxD) to improve power consumption using multiple antennas/receivers. Adaptive RxD may be performed using two or more antennas. In 2-way RxD, for example, if there has been insufficient data activity over some period of time, the diversity chain may be shut off, and this chain would remain off until data is received again. The present disclosure provides algorithms for selecting the number of diversity antennas/diversity chains based on various link quality metrics. These metrics can include, for example, the number of interferers, active set size, packets received, data rate, data rate control value, channel rank, a signal-to-interference-plus-noise ratio, or a carrier-to-interference ratio, which will be described in more detail below. In some embodiments, some RxD features may achieve the same throughput gain as a multi-antenna receiver that constantly enables all receive chains, while improving the energy per bit over adaptive 2-way RxD.

Figure 1:
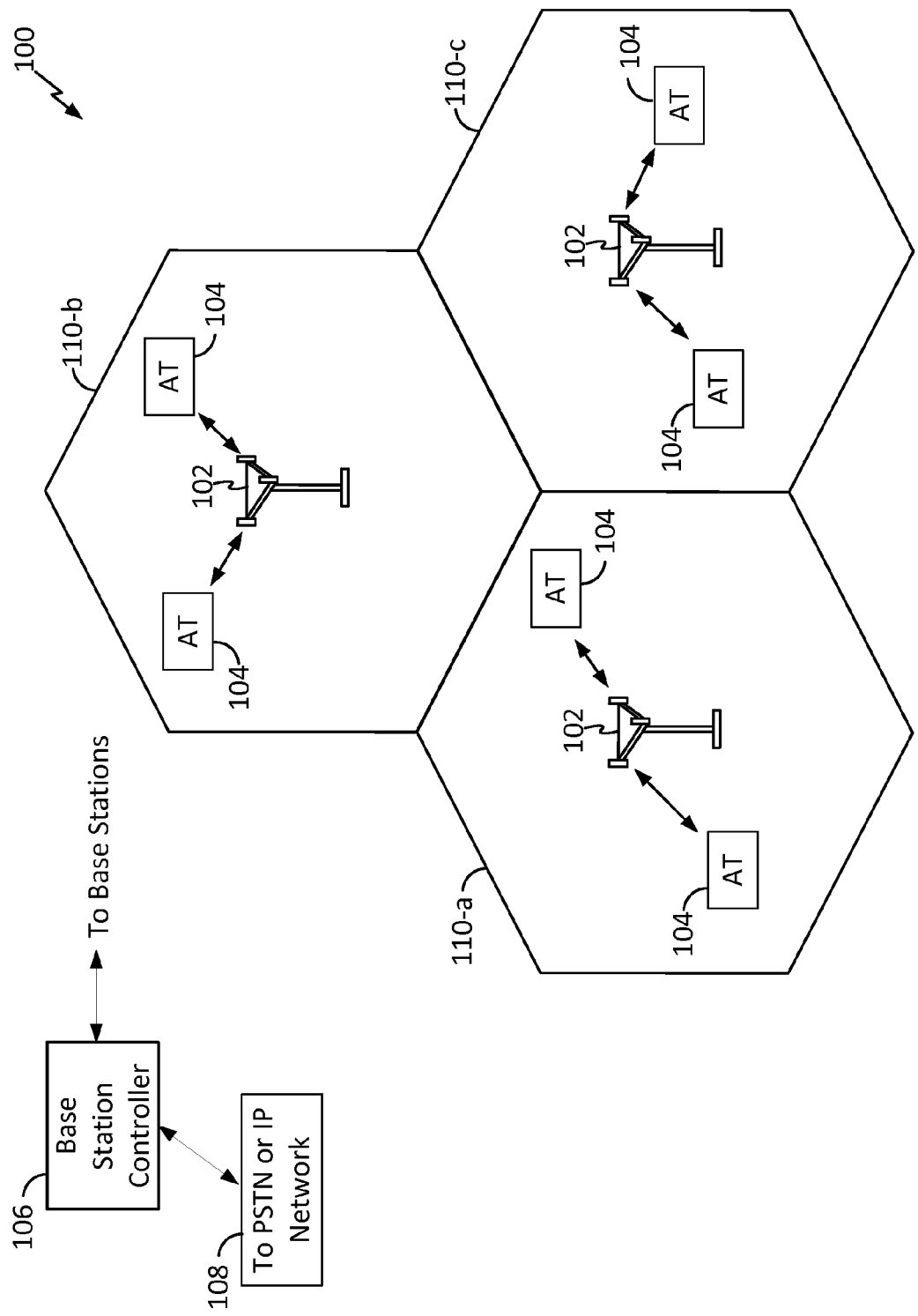
FIG. 1 is a schematic illustration of an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communication system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. The access terminal 104 can communicates with a base station 102 via a communication link. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communication device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, smart phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, entertainment devices, and/or other communication/computing devices which communicate, at least partially, through a wireless or cellular network.

Figure 2:
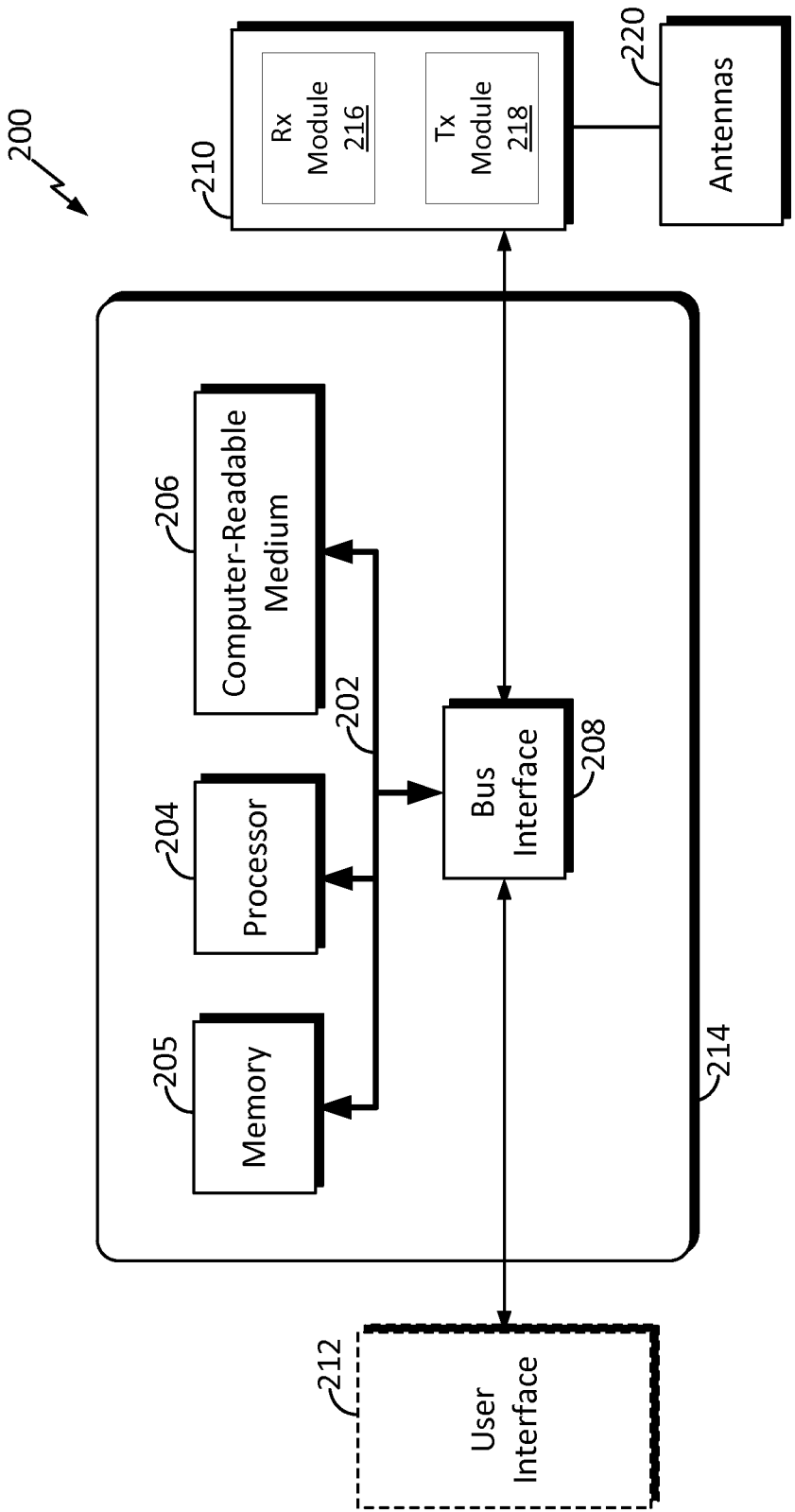
FIG. 2 is a conceptual diagram illustrating an example of a hardware implementation for an access terminal employing a processing system.

FIG. 2 is a conceptual diagram illustrating an example of a hardware implementation for an access terminal 200 employing a processing system 214. The access terminal 200 may be used as the access terminal 104. In accordance with various aspects of the disclosure, an element, or any portion of an element, or any combination of elements may be implemented with a processing system 214 that includes one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210 coupled to antennas 220.

The transceiver 210 provides a means for communicating with various other apparatus over a transmission medium. The transceiver 210 includes a receiver (Rx) module 216 and a transmitter (Tx) module 218. The receiver module 216 receives signals from the antennas 220, demodulates/processes the signals, and provides the processed signals to the processing system 214. The transmitter module 218 receives signals from the processing system 214, processes and modulates the signals and transmits the processed and modulated signals using the antennas 220. In some aspects, the receiver module 216 and transmitter module 218 may be incorporated into a single module or separate modules. In some aspects, the antennas 220 include a number of antennas used for transmission and reception of wireless communications on one or more communication channels. Depending upon the nature of the apparatus, a user interface 212 (e.g., keypad, display, speaker, touchscreen, microphone, joystick) may also be provided.

The processor 204 is responsible for managing the bus 202 and general processing, including the execution of software stored on the computer-readable medium 206. The software, when executed by the processor 204, causes the processing system 214 to perform the various functions described infra for any particular apparatus. The computer-readable medium 206 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
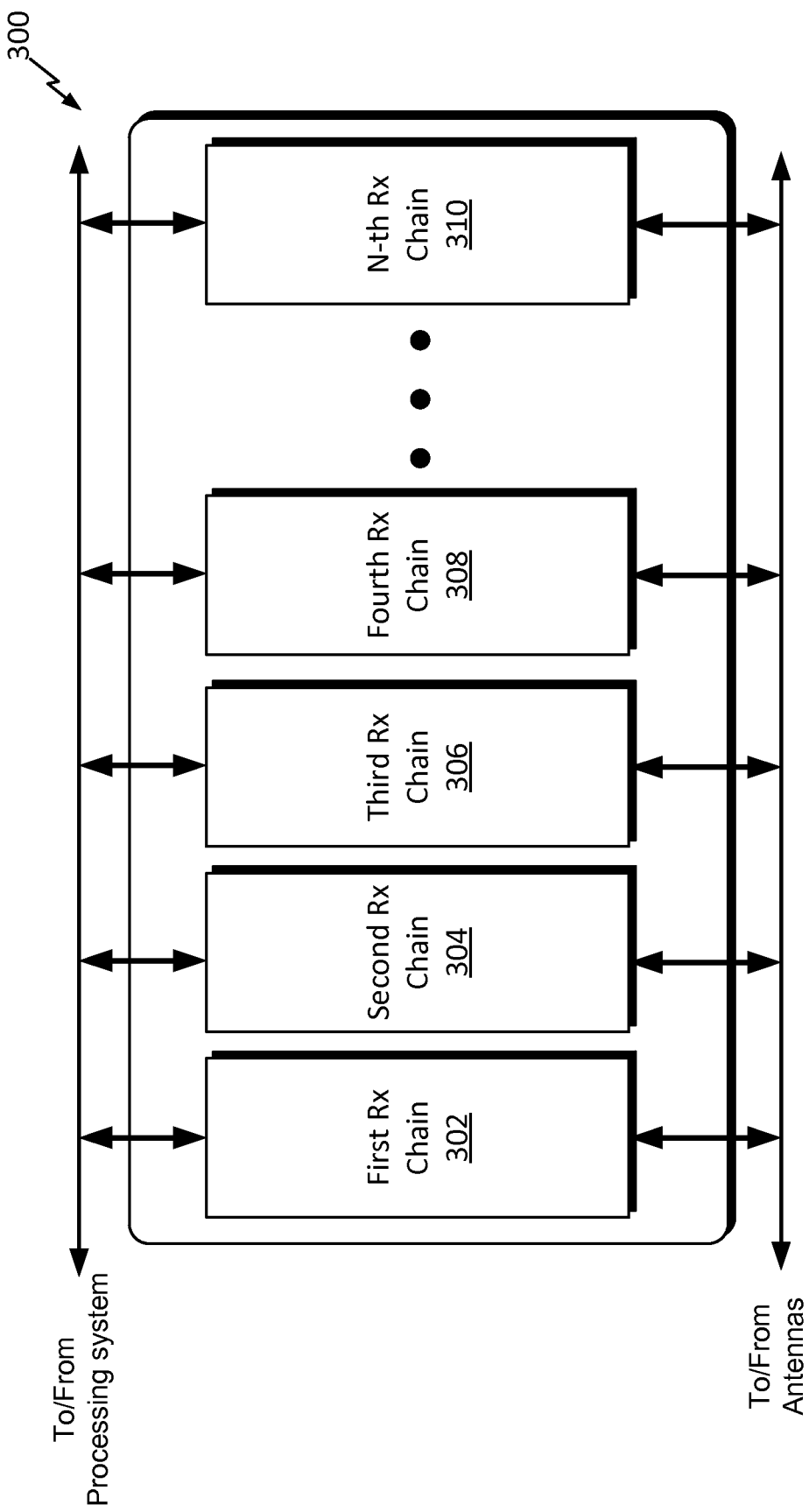
FIG. 3 is a block diagram illustrating an example of a receiver module having multiple receive chains in accordance with an aspect of the disclosure.

FIG. 3 is a block diagram illustrating an example of a receiver module 300 having multiple receive chains. The receiver module 300 may be used as the receiver module 216 in some scenarios. The receiver module 300 includes multiple receive (Rx) chains including a first receive chain 302, a second receive chain 304, a third receive chain 306, a fourth receive chain 308, and an n-th receive chain 310. The receiver 300 may have any suitable number of receive chains in various examples. The receive chains (302, 304, 306, 308, and 310) are respectively coupled to antennas (e.g., antennas 220) and receive wireless communication signals from the antennas. The first receive chain 302 may be coupled to a primary antenna and shares the primary antenna with a transmitter module (e.g., transmitter module 218). The second, third, fourth through n-th receive chains (304, 306, 308 . . . 310) are respectively coupled to a number of secondary antennas to form a number of diversity receive chains that can enhance data rate for reception of data and/or reduce interference at the access terminal Thus, as described, each receive chain can include one or more respective antennas.

Hereafter, aspects of the disclosure will be described using four receive chains (e.g., 302, 304, 306, and 308). It will be understood that more or less number of receive chains may be used in other embodiments. Each receive chain includes various components that are well understood and need not be described in detail here, and perform tasks related to reception and filtering of incoming signals, frequency conversion and gain control, and baseband processing of received signals to provide a digital output to a processing system (e.g., 214 of FIG. 2). In various aspects, as will be described in more detail below, some or all of the receive chains (e.g., second through n-th receive chain), may be selectively disabled under certain conditions to reduce overall power consumption of the access terminal. Some or all of the receive chains may also be enabled under certain conditions to improve data rate or reduce interference.

Figure 4:
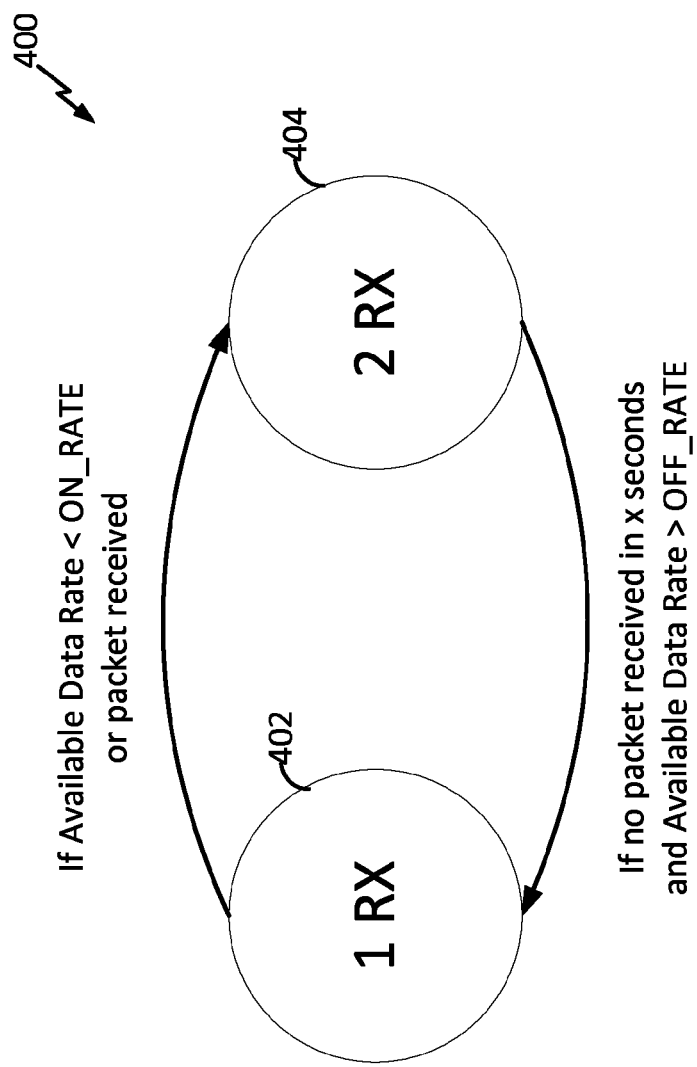
FIG. 4 is a drawing illustrating a state diagram for an adaptive 2-way receive diversity (RxD) design that may be implemented at an access terminal.

FIG. 4 is a drawing illustrating a state diagram 400 for an adaptive 2-way receive diversity (RxD) design that may be implemented at an access terminal (e.g., 104 of FIG. 1). For example, the access terminal may have two receive chains (e.g., Rx chain 302 as a primary chain and Rx chain 304 as a diversity chain). A timer may be used to keep track of the time in which an amount of data is received. If there has been insufficient data activity over a period of time x (e.g., a data inactivity time such as 100 to 200 msec) and the available data rate on the receive communication link is above a certain threshold OFF_RATE (e.g., 100 to 300 kbps for a single carrier EV-DO), one of the receive chains can be shut off (state 402). Once data is received again or when the available data rate is below a certain threshold ON_RATE (e.g., 100 to 300 kbps), both receive chains are enabled (state 404) and the timer for shutting off may be reset.

Figure 5:
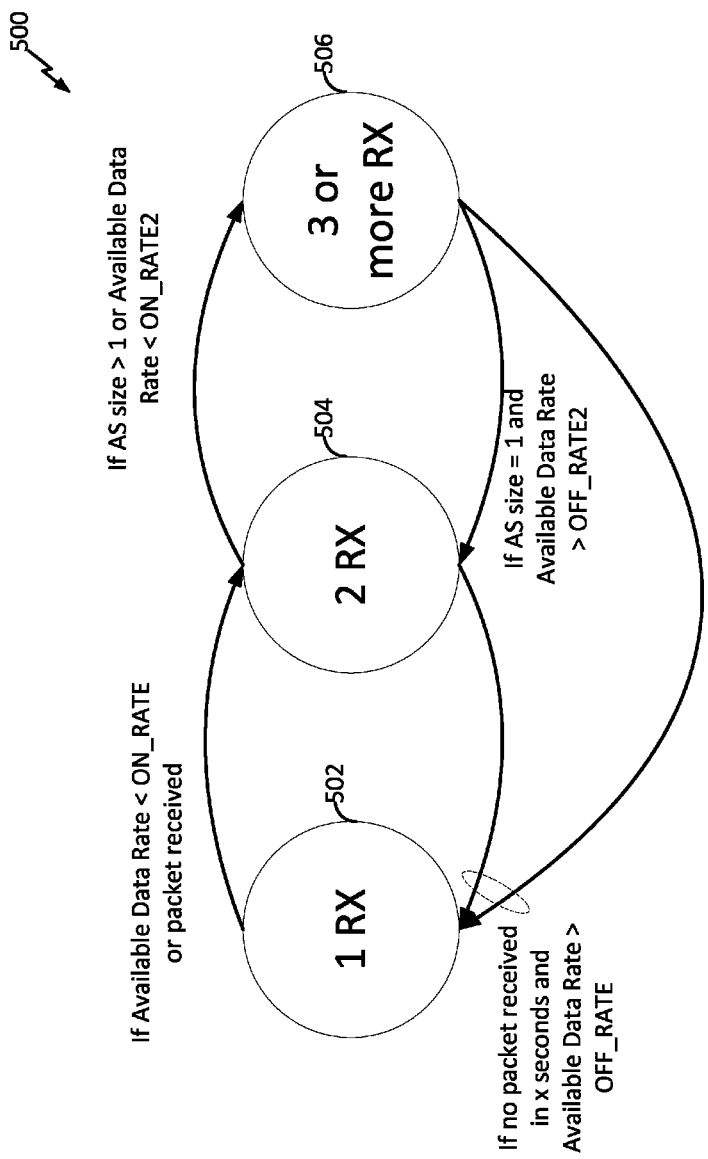
FIG. 5 is a drawing illustrating a state diagram for an adaptive 3-way or more RxD design that may be implemented at an access terminal for a single data stream in accordance with aspects of the disclosure.

In aspects of the disclosure, the state diagram 400 of FIG. 2 may be extended and modified to support 3-way or more RxD as needed. For example, FIG. 5 is a drawing illustrating a state diagram 500 for an adaptive 3-way or more receive diversity (RxD) design that may be implemented at an access terminal (e.g., 104 of FIG. 1) for a single data stream in accordance with some aspects of the disclosure. When there is a single data stream, the main benefit of multiple-antenna diversity is greater interference suppression. While 2-way RxD allows mitigation of one strong interferer, having 3-way or more RxD allows mitigation of two or three strong interferers, respectively. In cases where there are no strong interferers, 2-way RxD may increase data rates (or even achieve peak data rates), and the addition of more diversity chains affords little to no throughput gain but can cause a large increase in power consumption. The state diagram 500 provides a new state for enabling additional receive chains (e.g., 3-way or more RxD) under certain conditions to improve receiver performance without unnecessarily increasing power consumption per information bit.

Referring to FIG. 5, if little or no packet activity in time x (e.g., a data inactivity time such as 100 to 200 msec) is detected and the available data rate is greater than or equal to OFF_RATE (e.g., 100 to 300 kbps for a single carrier EV-DO), an access terminal returns to a non-diversity state or a single receive chain (1 Rx) operation (state 502) from 2-way RxD (state 504) or 3-way or more RxD (state 506). If the available data rate is less than the ON_RATE (e.g., 100 to 300 kbps for a single carrier EV-DO) or a packet is received, the access terminal transitions to state 504 to enable 2-way RxD. In state 504, if the active set (AS) size is greater than 1, this indicates the presence of one or more strong interferers. In some embodiments, when this occurs it becomes beneficial to enable more diversity antennas for increased interference suppression. Also, if the available data rate on the communication link is below a certain threshold ON_RATE2 (e.g., 1.2 to 2 Mbps for a single carrier EV-DO), this suggests that the interference suppression and diversity gain from 2-way RxD may be insufficient. In some embodiments, when this occurs, the access terminal may transition to state 506 to enable more diversity chains (e.g., 3-way or more RxD).

From state 506, a return path to state 504 (2-way RxD) occurs when the available data rate reaches a value greater than OFF_RATE2 (e.g., 2.5 to 3.1 Mbps for a single carrier EV-DO) with AS size=1. In some aspects, OFF_RATE2 may be a peak data rate (e.g., 3.1 Mbps for EV-DO revision A) of the communication link. A direct return path from any diversity state (state 504 or 506) to state 502 (single antenna operation) occurs when there is insufficient data activity over some time x (e.g., data inactivity time such as 100 to 200 msec) and the available data rate is greater than or equal to OFF_RATE. The above described diversity control algorithm assumes there is only one data stream to be decoded (this can be from any multitude of transmit antennas).

Figure 6:
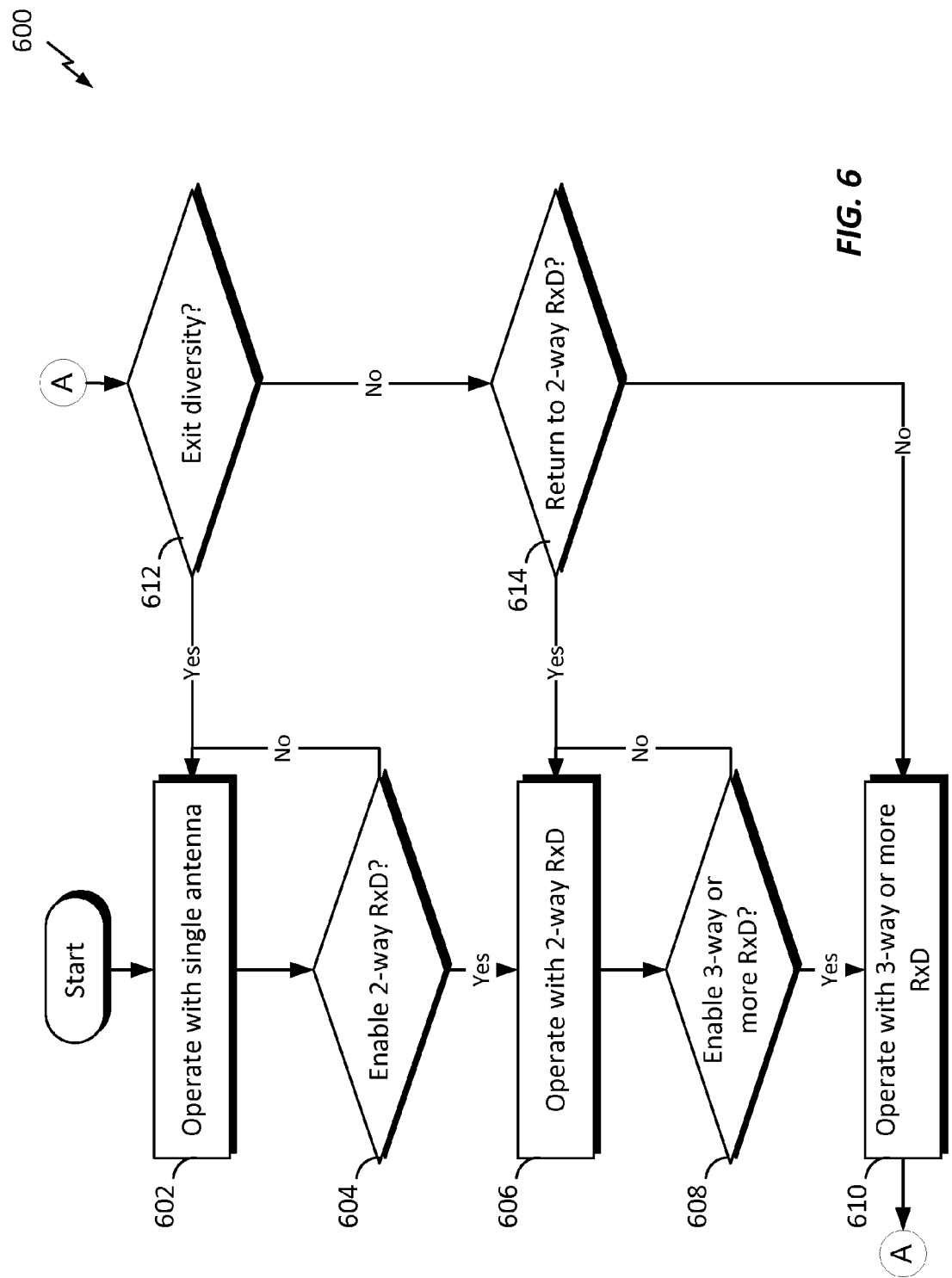
FIG. 6 is a flow chart illustrating an adaptive 3-way or more RxD control algorithm that may be implemented at an access terminal for a single data stream in accordance with aspects of the disclosure.

FIG. 6 is a flow chart 600 illustrating an adaptive 3-way or more receive diversity (RxD) control algorithm that may be implemented at an access terminal (e.g., AT 104 of FIG. 1) for a single data stream in accordance with aspects of the disclosure. In step 602, it is assumed that the access terminal is initially operating with a single antenna (e.g., 502 of FIG. 5). In step 604, if the access terminal determines to operate with 2-way RxD (e.g., 504 of FIG. 5), it continues in step 606; otherwise, it returns to step 602. For example, if the available data rate is less than 153 kbps or a data packet is received at the access terminal, it continues to step 606 to enable 2-way RxD. In step 608, if the access terminal determines to operate with 3-way or more RxD (e.g., 506 of FIG. 5), it continues to step 610; otherwise, it returns to step 606. For example, if AS size is greater than 1 or the available data rate is below a certain threshold (e.g., 1.8 Mbps for single-carrier EV-DO Rev. B), the access terminal continues to state 610 to enable more diversity chains (e.g., 3-way RxD or more RxD). In step 612, if the access terminal determines to exit the diversity state, it returns to step 602; otherwise, it continues to step 614. For example, the access terminal returns to single antenna operation (e.g., 502 of FIG. 5) when there is insufficient data activity for time x (e.g., a data inactivity time such as 100 to 200 msec), and the available data rate is greater than or equal to 153 kbps. In step 614, if the access terminal determines to return to 2-way RxD, it returns to step 606; otherwise, it continues to step 610. For example, the access terminal returns to 2-way RxD from 3-way or more RxD when a suitable condition occurs, e.g., available data rate exceeds 3.1 Mbps with AS size=1.

In various cellular technologies, multiple data streams may be served to one access terminal (e.g., AT 104 of FIG. 1). Examples include dual codeword MIMO in LTE, where multiple streams are sent from one base station, and single carrier multi-link (SCML) for EV-DO, where two base stations can each send a single data stream to one mobile simultaneously. The above-described algorithm for single data stream can be extended to these cases readily, with a few changes to criterion.

Figure 7:
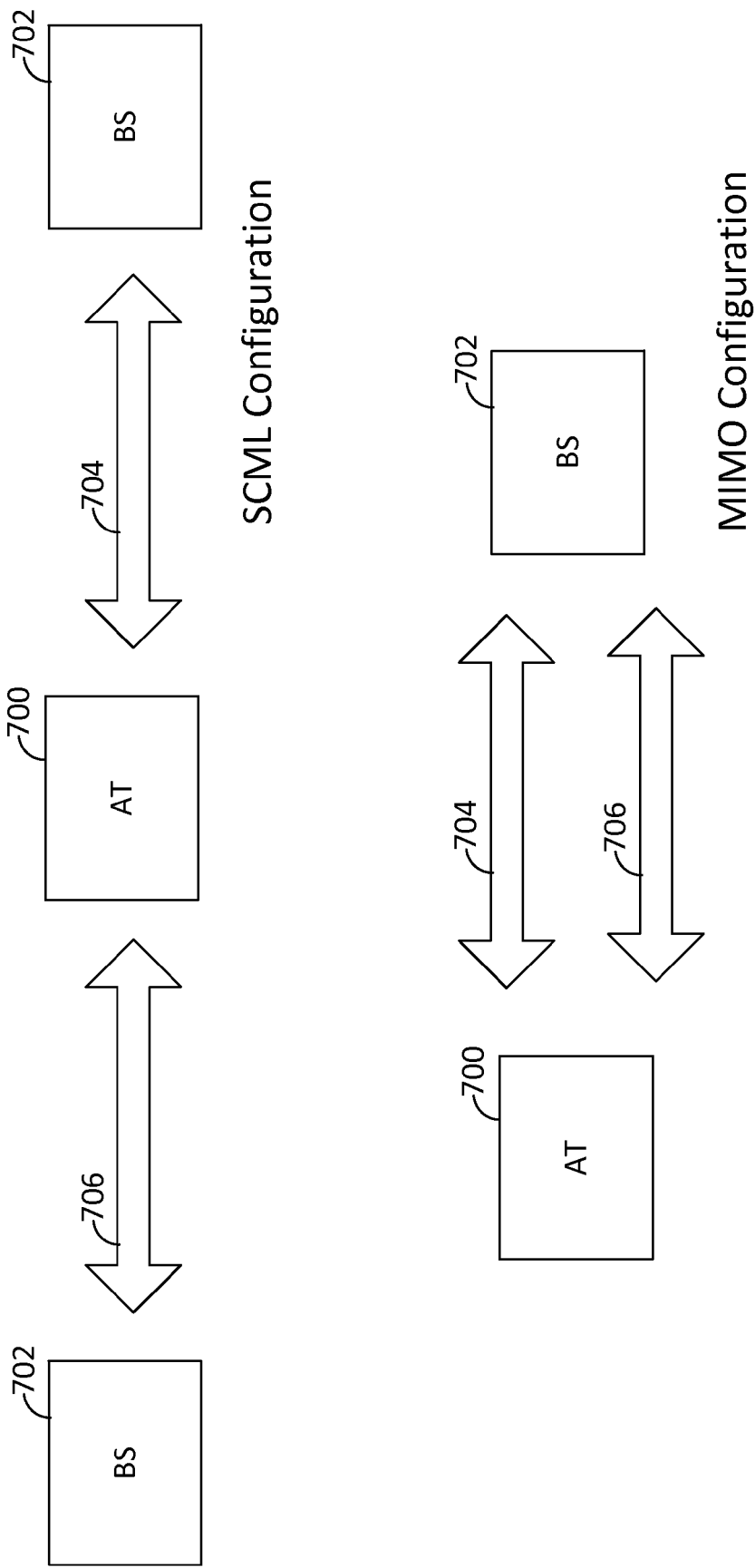
FIG. 7 is a conceptual drawing illustrating an access terminal in wireless communications with one or more base stations using a communication link including multiple data streams.

Referring to FIG. 7, an access terminal 700 (e.g., AT 104 of FIG. 1) is in wireless communication with one or more base stations 702 (e.g., 102 of FIG. 1) using a communication link that includes multiple data streams. For example, the top of FIG. 7 shows a first data stream 704 from a first base station 702 and a second data stream 706 from a second base station 702, representing operation with SCML. The bottom of FIG. 7 shows a case where the first and second data streams originate from the same base station, representing operation with MIMO. In aspects of the disclosure, an additional data rate criterion on the weakest data stream may be used. If the second data stream 706 can only sustain less than a certain threshold data rate, the access terminal 700 may enable additional receive antennas (e.g., 3-way or more RxD). This threshold for the second stream 706 may not be the same as the threshold used in the single stream implementation of FIGS. 5 and 6.

Figure 8:
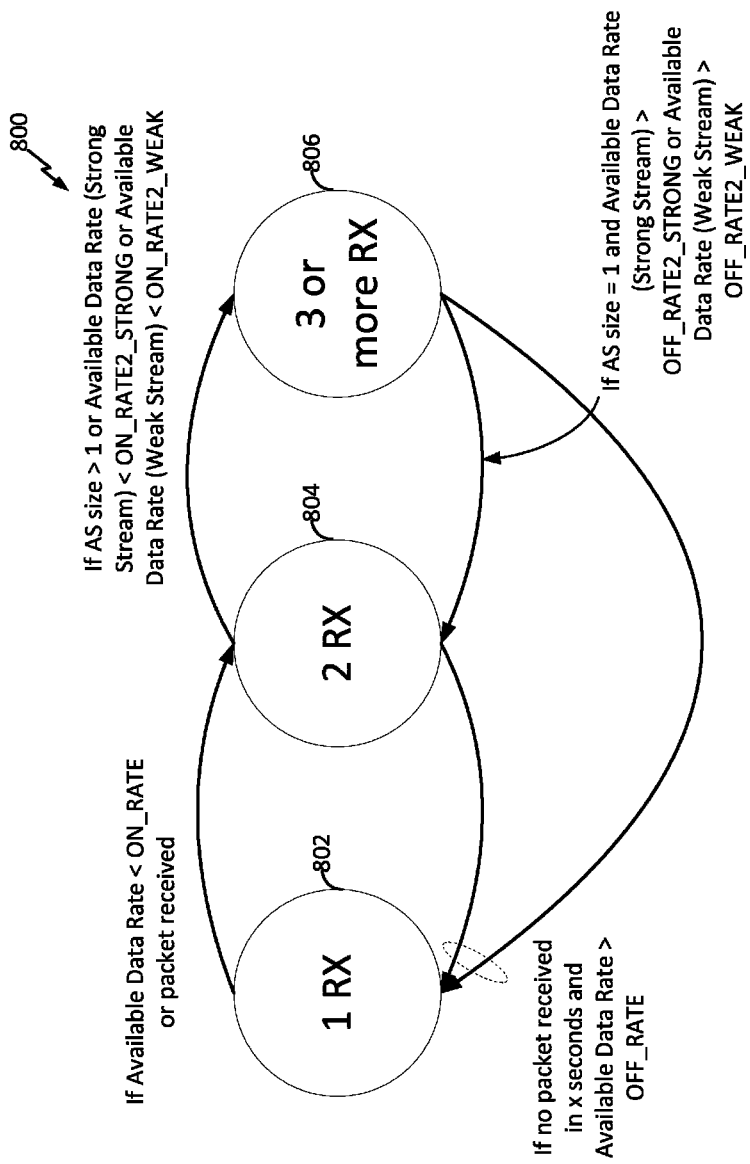
FIG. 8 is a drawing illustrating a state diagram for an adaptive 3-way or more RxD design that may be implemented at an access terminal for multiple data streams in accordance with aspects of the disclosure.

FIG. 8 is a drawing illustrating a state diagram 800 for an adaptive 3-way or more receive diversity (RxD) design that may be implemented at an access terminal (e.g., AT 104 of FIG. 1) for multiple data streams in accordance with some aspects of the disclosure. Referring to FIG. 8, if little or no packet activity is detected over some time x (e.g., a data inactivity time such as 100 to 200 msec) and the available data rate is greater than or equal to a certain threshold OFF_RATE (e.g., 100 to 300 kbps for a single carrier EV-DO), an access terminal returns to a non-diversity state or a single receive chain (1 Rx) operation (state 802) from 2-way RxD (state 804) or 3-way or more RxD (state 806). If the available data rate is less than a certain threshold ON_RATE (e.g., 100 to 300 kbps for a single carrier EV-DO) or a packet is received, the access terminal transitions to state 804 to enable 2-way RxD. In state 804, if the AS size is greater than 1, this indicates the presence of one or more strong interferers, at which point it becomes beneficial to enable more diversity antennas for increased interference suppression. Also, if the available data rate on the strongest data stream (e.g., data stream 704) is below a certain threshold ON_RATE2_STRONG (e.g., 1.2 to 2 Mbps for a single carrier EV-DO), or the available data rate on the weakest data stream (e.g., data stream 706) is non-zero but below a certain threshold ON_RATE2_WEAK (e.g., 100 to 300 kbps for a single carrier EV-DO), this suggests that further rate gains on either the strong or weak data streams might be afforded from interference suppression and diversity resulting from more receive antennas.

From state 806, the access terminal returns to state 804 (2-way RxD) if AS size=1 and both the available data rates on the strong and weak streams exceed OFF_RATE2_STRONG and OFF_RATE2_WEAK, respectively (e.g., 2.5 to 3.1 Mbps for a single carrier EV-DO). A direct return path from any diversity state (state 804 or 806) to state 802 (single antenna operation) occurs when there is insufficient data activity over some time x (e.g., a data inactivity time such as 100 to 200 msec) and the available data rate is greater than or equal to OFF_RATE.

Figure 9:
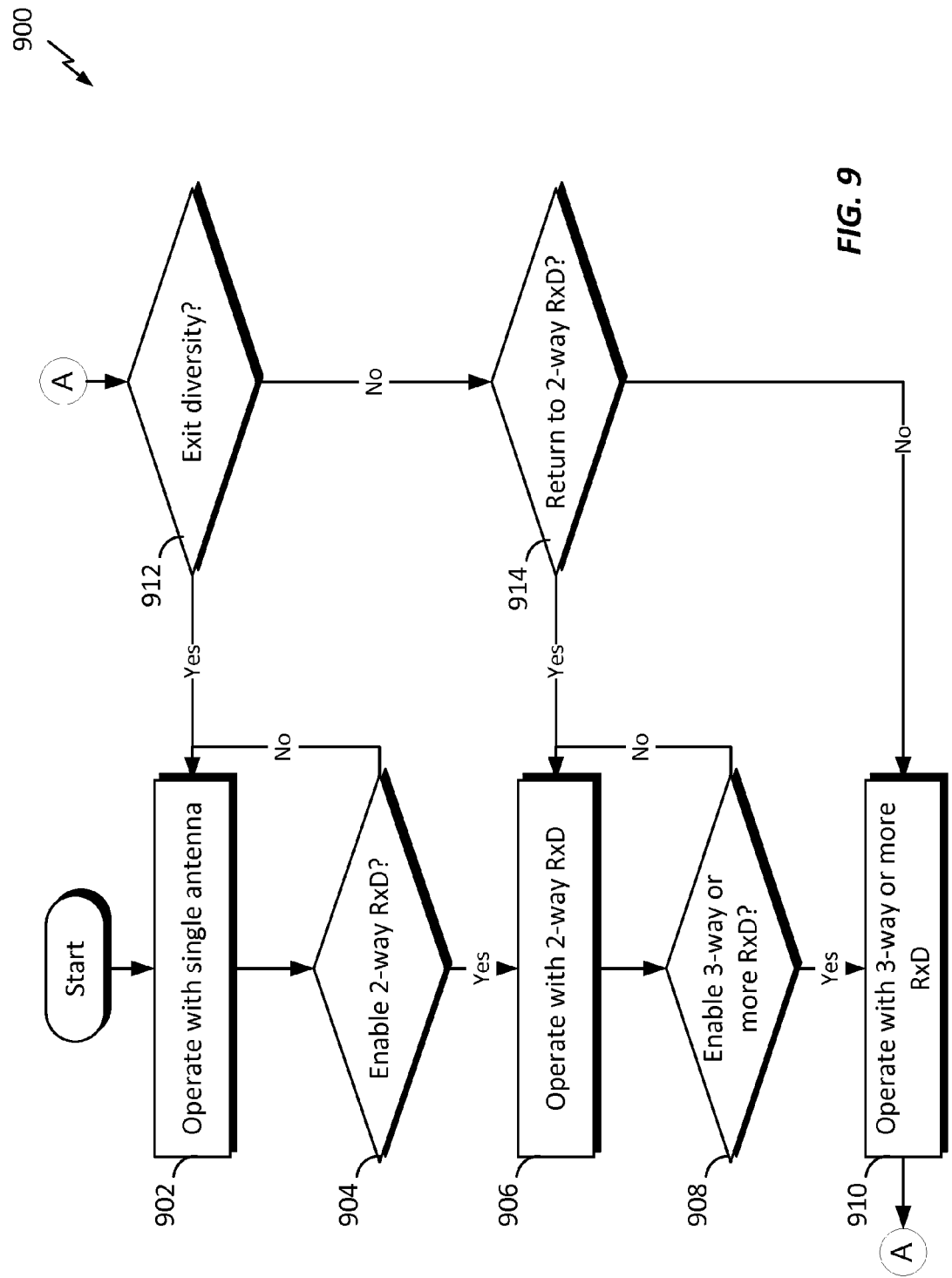
FIG. 9 is a flow chart illustrating an adaptive 3-way or more RxD control algorithm that may be implemented at an access terminal for multiple data stream in accordance with aspects of the disclosure.

FIG. 9 is a flow chart 900 illustrating an adaptive 3-way or 4-way receive diversity (RxD) control algorithm that may be implemented at an access terminal (e.g., AT 104 of FIG. 1) for multiple data streams (e.g., data streams 704 and 706) in accordance with some aspects of the disclosure. In step 902, it is assumed that the access terminal is initially operating with a single antenna (e.g., 802 of FIG. 8). In step 904, if the access terminal determines to operate with 2-way RxD (e.g., 904 of FIG. 9), it continues in step 906; otherwise, it returns to step 902. For example, if the available data rate is less than 153 kbps or a data packet is received at the access terminal, it continues to step 906 to enable 2-way RxD. In step 908, if the access terminal determines to operate with 3-way or 4-way RxD (e.g., 906 of FIG. 9), it continues to step 910; otherwise, it returns to step 906. For example, if AS size>1, the data rate on the strong data stream (e.g., data stream 704) is less than ON_RATE2_STRONG, or the data rate on the weak data stream (e.g., data stream 706) is less than ON_RATE2_WEAK, the access terminal continues to state 910 to enable more diversity chains (e.g., 3-way RxD or more RxD). In step 912, if the access terminal determines to exit the diversity state, it returns to step 902; otherwise, it continues to step 914. For example, the access terminal returns to single antenna operation (e.g., 902 of FIG. 9) when there is insufficient data activity (e.g., no packet received in about 100 to 200 msec) and the available data rate is greater than or equal to 153 kbps. In step 914, if the access terminal determines to return to 2-way RxD, it returns to step 906; otherwise, it continues to step 910. For example, the access terminal returns to 2-way RxD from 3-way or more RxD if AS size=1, the available data rate on the strong stream is greater than OFF_RATE2_STRONG, and the data rate on the weak stream is greater than OFF_RATE2_WEAK.

An alternative option which may be appropriate for MIMO systems is to augment the data rate conditions with a channel rank condition on the channel from the access terminal to the base station. That is, a channel matrix representing the signal transfer from N_t base station transmit antennas to N_r access terminal receive antennas has been estimated, the rank of this matrix can be readily computed. Then, if the channel rank is above 1, the access terminal may benefit from enabling more than two receive antennas, since the two data streams have used up all degrees of freedom available from those two receive antennas.

Figure 10:
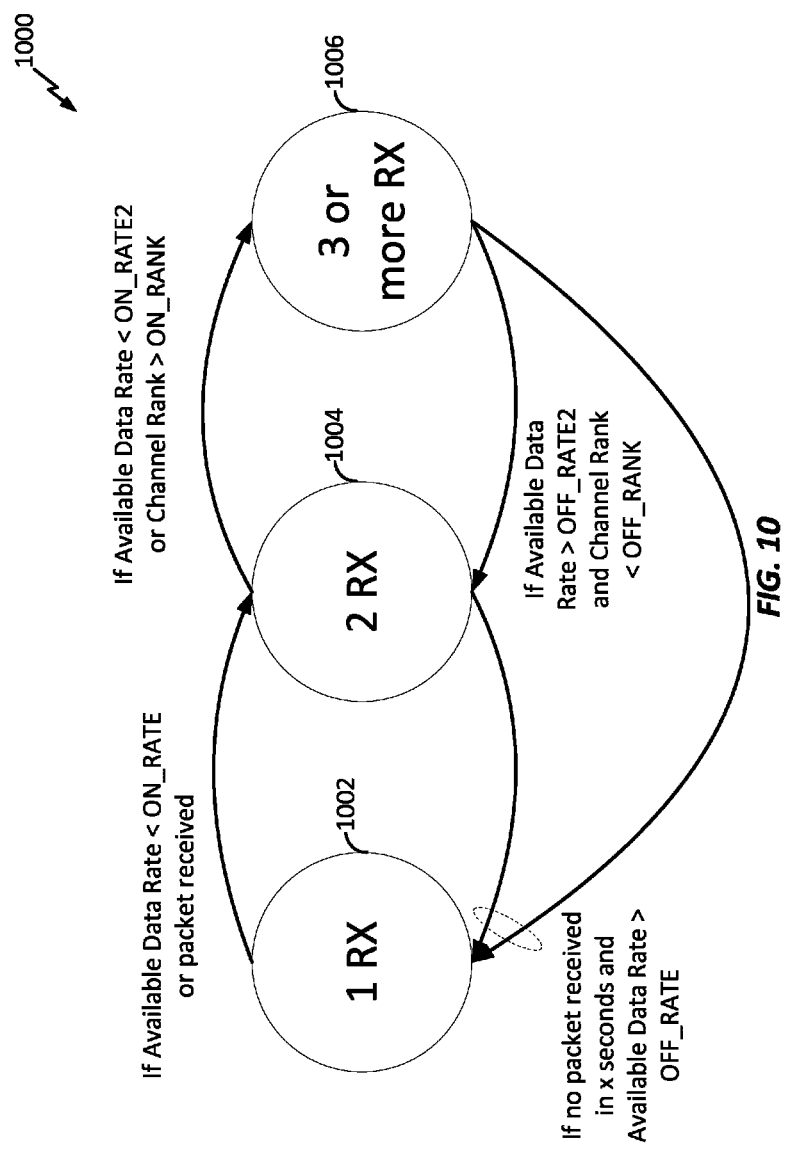
FIG. 10 is a drawing illustrating a state diagram for an adaptive 3-way or more RxD design that may be implemented at an access terminal for multiple data streams in accordance with aspects of the disclosure.

FIG. 10 is a drawing illustrating a state diagram 1000 for an adaptive 3-way or more receive diversity (RxD) design that may be implemented at an access terminal (e.g., AT 104 of FIG. 1) for multiple data streams in accordance with some aspects of the disclosure. Referring to FIG. 10, if little or no packet activity is detected in a time period x (e.g., 100 to 200 msec) and the available data rate is greater than or equal to a certain threshold OFF_RATE (e.g., 100 to 300 kbps for a single carrier EV-DO), an access terminal returns to a non-diversity state or a single receive chain (1 Rx) operation (state 1002) from 2-way RxD (state 1004), or 3-way or more RxD (state 1006). If the available data rate is less than a certain threshold ON_RATE (e.g., 100 to 300 kbps for a single carrier EV-DO) or a packet is received, the access terminal transitions to state 1004 to enable 2-way RxD. In state 1004, if channel rank is greater than a certain threshold ON_RANK (e.g., 1), this indicates insufficient degrees of freedom for further interference suppression, in which case enabling more diversity chains (e.g., 3-way or more RxD) can be beneficial.

From state 1006, the access terminal returns to state 1004 (2-way RxD) if the channel rank is less than a certain threshold OFF_RANK (e.g., 2) and the available data rate is larger than a certain threshold OFF_RATE2 (e.g., 2.5 to 3.1 Mbps for a single carrier EV-DO). A direct return path from any diversity state (state 1004 or 1006) to state 1002 (single antenna operation) occurs when there is insufficient data activity in a time period x (e.g., no packet received in 100 to 200 msec) and the available data rate is greater than or equal to OFF_RATE.

Figure 11:
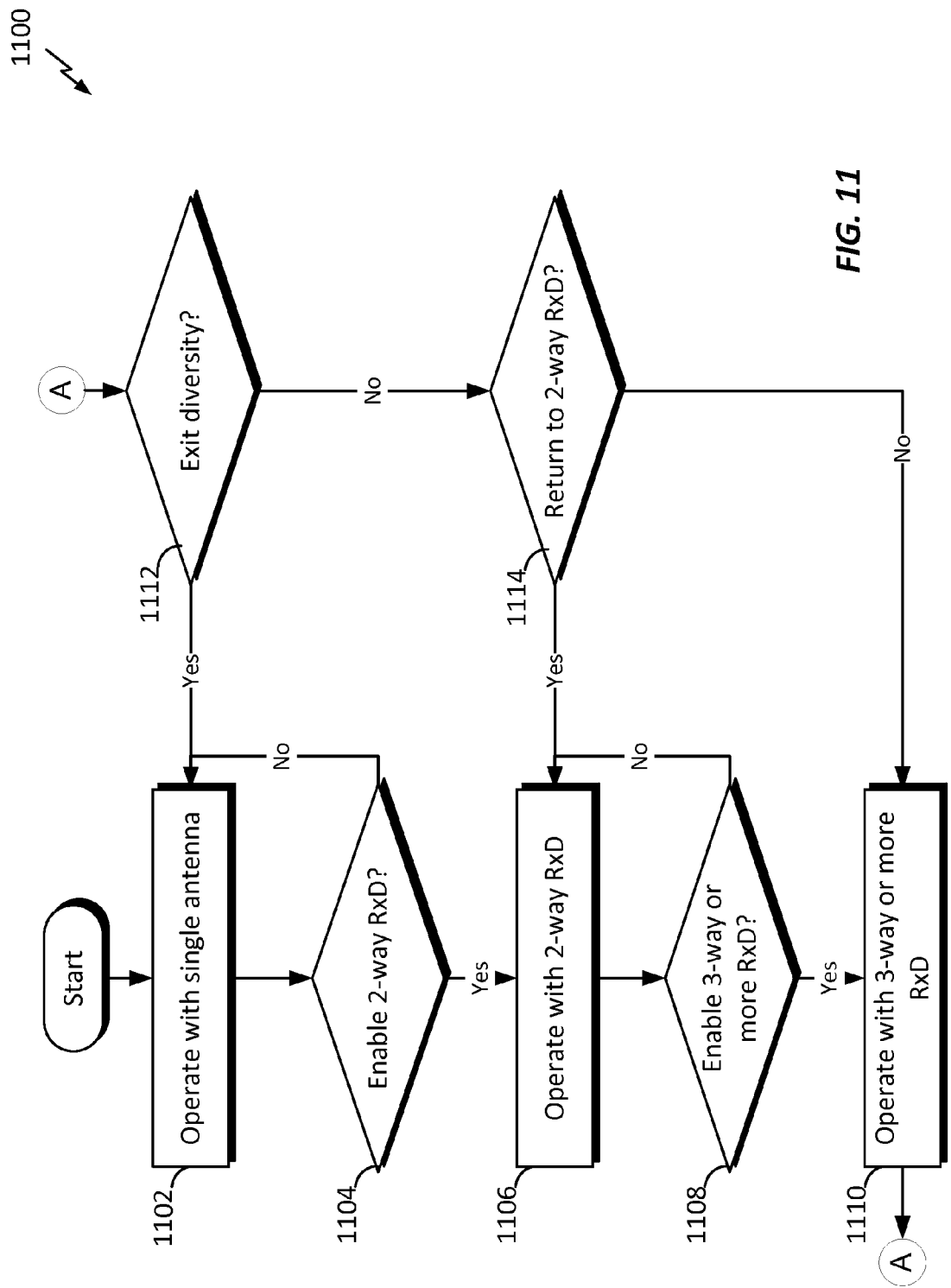
FIG. 11 is a flow chart illustrating an adaptive 3-way or more RxD control algorithm that may be implemented at an access terminal for multiple data stream in accordance with aspects of the disclosure.

FIG. 11 is a flow chart 1100 illustrating an adaptive 3-way or more receive diversity (RxD) control algorithm that may be implemented at an access terminal (e.g., AT 104 of FIG. 1) for multiple data streams (e.g., data streams 704 and 706) in accordance with some aspects of the disclosure. In step 1102, it is assumed that the access terminal is initially operating with a single antenna (e.g., 1002 of FIG. 10). In step 1104, if the access terminal determines to operate with 2-way RxD (e.g., 1004 of FIG. 10), it continues in step 1106; otherwise, it returns to step 1102. For example, if the available data rate is less than 153 kbps or a data packet is received at the access terminal, it continues to step 1106 to enable 2-way RxD. In step 1108, if the access terminal determines to operate with 3-way or more RxD (e.g., 1006 of FIG. 10), it continues to step 1110; otherwise, it returns to step 1106. For example, if a channel rank is greater than 1, the access terminal continues to state 1110 to enable more diversity chains (e.g., 3-way RxD or more RxD). In step 1112, if the access terminal determines to exit the diversity state, it returns to step 1102; otherwise, it continues to step 1114. For example, the access terminal returns to single antenna operation (e.g., 1002 of FIG. 10) when there is insufficient data activity (e.g., no packet received in about 100 to 200 msec) and the available data rate is greater than or equal to 153 kbps. In step 1114, if the access terminal determines to return to 2-way RxD, it returns to step 1106; otherwise, it continues to step 1110. For example, the access terminal returns to 2-way RxD from 3-way or more RxD if the channel rank is less than a certain threshold, e.g., 2.

The above-described algorithms may achieve the same throughput gain as a multi-antenna receiver that constantly enables all receive chains, while improving the energy efficiency of energy per bit over adaptive 2-way RxD. In various aspects, the metrics used for the data rate can be based on the filtered data rates (a requested data rate, a predicted data rate, or a measured data rate), or some variations along these metrics. Additionally, in some aspects, the data rate may be replaced with some functions of signal to interference plus noise ratio (SINR) or carrier-to-interference (C/I) measurements. The thresholds may be different for such cases. In some aspects, complexity may be further added so that 2-way RxD metrics are always computed when an access terminal is configured for 3-way or more RxD, so that they may be utilized to trigger the return path for 2-way RxD, e.g., using a condition of AS size=1 and there is very high SINR across two antennas (e.g., 12 dB or more).

Figure 12:
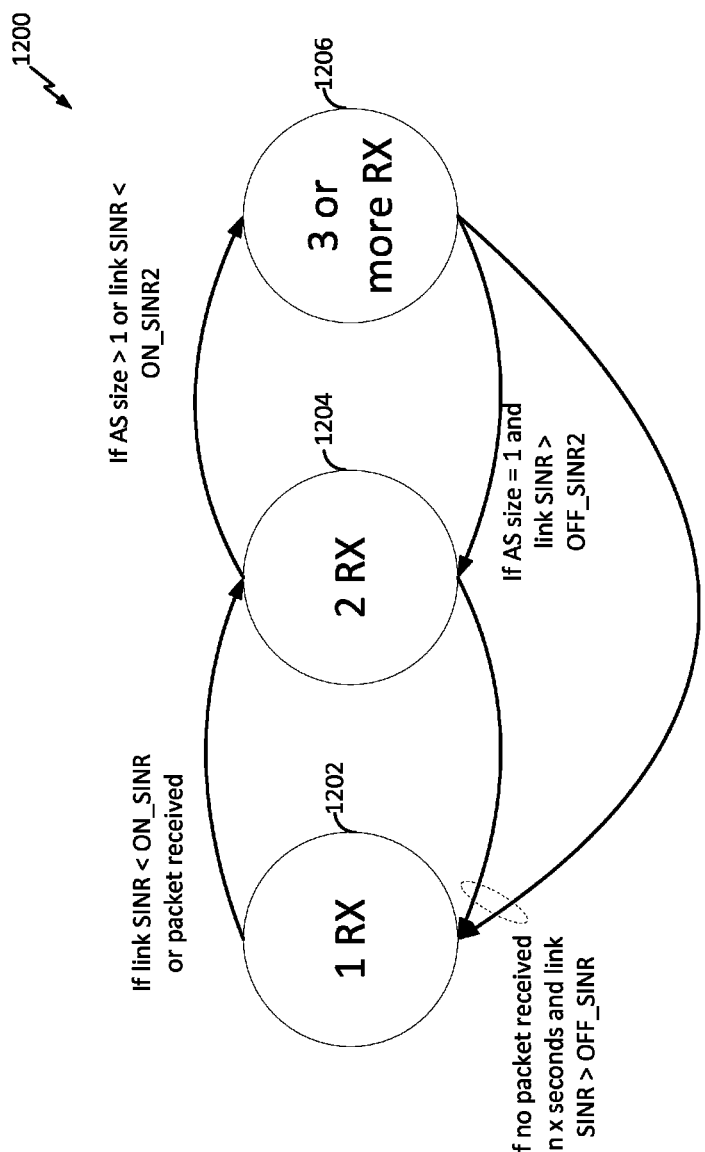
FIG. 12 is a drawing illustrating a state diagram for an adaptive 3-way or more RxD design based on link signal to interference plus noise ratio (SINR) in accordance with aspects of the disclosure.

For example, FIG. 12 is a drawing illustrating a state diagram 1200 for an adaptive 3-way or more receive diversity (RxD) based on link SINR in accordance with some aspects of the disclosure. The state diagram 1200 may be implemented at an access terminal (e.g., 104 of FIG. 1). Referring to FIG. 12, if little or no packet activity in time x (e.g., a data inactivity time such as 100 to 200 msec) is detected and link SINR is greater than a certain threshold OFF_SINR (e.g., −6 to −3 dB), an access terminal returns to a non-diversity state or a single receive chain (1 Rx) operation (state 1202) from 2-way RxD (state 1204) or 3-way or more RxD (state 1206). If link SINR is less than a certain threshold ON_SINR (e.g., −6 to −3 dB) or a packet is received, the access terminal transitions to state 1204 to enable 2-way RxD. In state 1204, if the active set (AS) size is greater than 1, this indicates the presence of one or more strong interferers. In some embodiments, when this occurs it becomes beneficial to enable more diversity antennas for increased interference suppression. Also, if the link SINR is below a certain threshold ON_SINR2 (e.g., 4 to 8 dB), this suggests that the interference suppression and diversity gain from 2-way RxD may be insufficient. In some embodiments, when this occurs, the access terminal may transition to state 1206 to enable more diversity chains (e.g., 3-way or more RxD).

From state 1206, a return path to state 1204 (2-way RxD) occurs when link SINR is greater than a certain threshold OFF_SINR2 (e.g., 12 to 15 dB) with AS size=1. A direct return path from any diversity state (state 1204 or 1206) to state 1202 (single antenna operation) occurs when there is insufficient data activity over some time x (e.g., data inactivity time such as 100 to 200 msec) and link SINR is greater than OFF_SINR.

Figure 13:
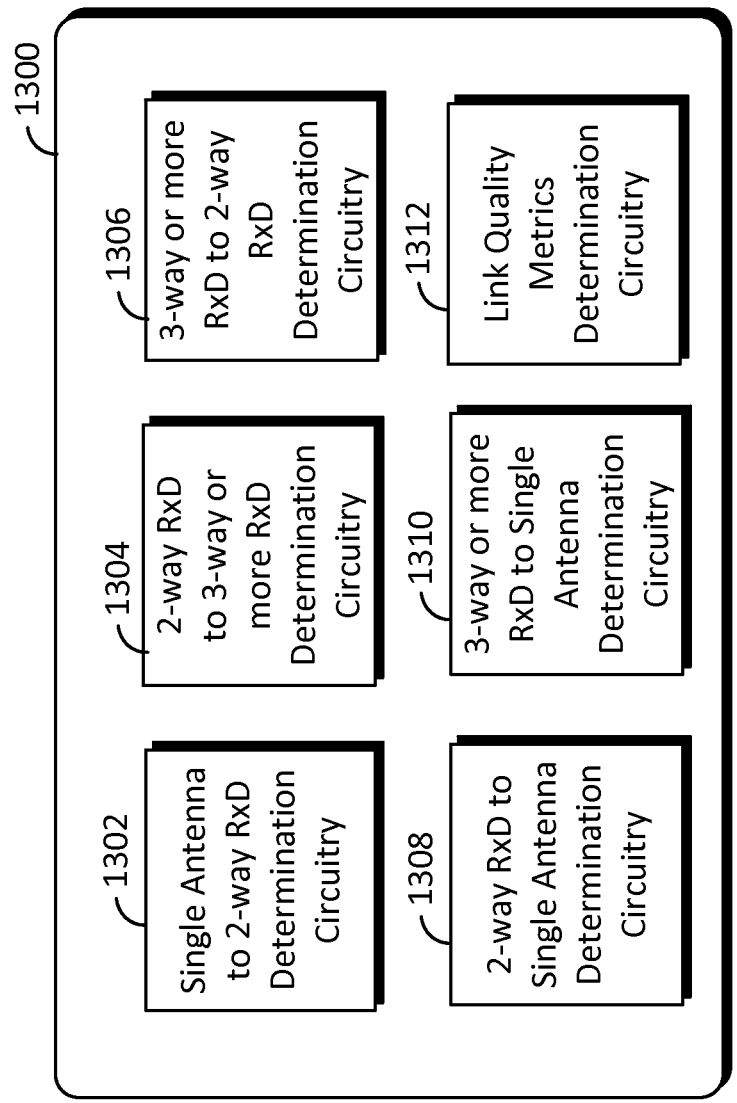
FIG. 13 is a block diagram illustrating some functional blocks of a processing system in accordance with aspects of the disclosure.

FIG. 13 is a block diagram illustrating some functional blocks of a processing system 1300 in accordance with aspects of the disclosure. In an aspect, the processing system 1300 may be implemented with the processing system 214. The processing system 1300 includes a single antenna to 2-way RxD determination circuitry 1302, a 2-way RxD to 3-way or more RxD determination circuitry 1304, a 3-way or more RxD to 2-way RxD determination circuitry 1306, a 2-way RxD to single antenna determination circuitry 1308, a 3-way or more RxD to single antenna determination circuitry 1310, and a link quality metrics determination circuitry 1312. The single antenna to 2-way RxD determination circuitry 1302 may be utilized to switch an access terminal (e.g., AT 104) from a single antenna state (e.g., states 502, 802, 1002, and 1202) to a 2-way RxD state (e.g., states 504, 804, 1004, and 1204). The 2-way RxD to 3-way or more RxD determination circuitry 1304 may be utilized to switch the access terminal from a 2-way RxD state (e.g., states 504, 804, 1004, and 1204) to a 3-way or more RxD state (e.g., states 506, 806, 1006, and 1206). The 3-way or more RxD to 2-way RxD determination circuitry 1306 may be utilized to switch the access terminal from the 3-way or more RxD state to the 2-way RxD state. The 2-way RxD to single antenna determination circuitry 1308 may be utilized to switch the access terminal from the 2-way RxD state to the single antenna state. The 3-way or more RxD to single antenna determination circuitry 1310 may be utilized to switch the access terminal from the 3-way or more RxD state to the single antenna state. The link quality metrics determination circuitry 1312 may be utilized to determine link quality metrics (e.g., the number of interferers, active set size, packets received, data rate, data rate control value, channel rank, a signal-to-interference-plus-noise ratio, or a carrier-to-interference ratio). In various aspects, the processing system 1300 may be utilized to implement the various state diagrams and flow charts described in FIGS. 5 through 12.

In one configuration, the access terminal 200 includes means for enabling a first receive-diversity (RxD) state utilizing two receive chains for a communication link; means for determining link quality metrics corresponding to the communication link; and means for selectively switching from the first RxD state to a second RxD state utilizing three or more receiver chains dependent upon the link quality metrics, such that the energy per bit of the second RxD state is more efficient than the energy per bit of the first RxD state. In another aspect, the aforementioned means may be a module or any apparatus configured to perform the functions recited by the aforementioned means. In an aspect, the means for enabling a first RxD state may be a single antenna to 2-way RxD determination circuitry 1302. In an aspect, the means for determining link quality metrics may be a link quality metrics determination circuitry 1312. In an aspect, the means for selectively switching from the first RxD state to the second RxD state may be a 2-way RxD to 3-way or more RxD determination circuitry 1304.

Several aspects of a telecommunication system have been presented with reference to a certain wireless communication system. As those skilled in the art will readily appreciate, various aspects described throughout this disclosure may be extended to other telecommunication systems, network architectures and communication standards.

By way of example, various aspects may be extended to UMTS systems such as W-CDMA, TD-SCDMA, and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for controlling receive diversity in a wireless communication network, comprising:
   enabling a first receive-diversity (RxD) state at an access terminal utilizing two receive chains for a communication link;
   determining link quality metrics corresponding to the communication link;
   selectively switching from the first RxD state to a second RxD state utilizing three or more receive chains dependent upon the link quality metrics such that the energy per bit of the second RxD state is more energy efficient than the energy per bit of the first RxD state; and
   switching from the second RxD state to the first RxD state:
      if a number of interferers is less than or equal to 1 and a data rate of a stream of data on the communication link is equal to or greater than a data rate threshold value; or
      if the number of interferers is less than or equal to 1 and a signal-to-interference-plus-noise ratio (SINR) is greater than a SINR threshold value.

2. The method of claim 1,
   wherein the communication link comprises a single stream of data, and
   wherein the link quality metrics comprise at least one selected from the group consisting of the number of interferers, the data rate of the stream of data, the signal-to-interference-plus-noise ratio (SINR), and a carrier-to-interference ratio (C/I).

3. The method of claim 2, wherein the data rate is based on a requested data rate, a predicted data rate, or a measured data rate.

4. The method of claim 1, wherein the selectively switching comprises switching from the first RxD state to the second RxD state:
   if the number of interferers is greater than 1; or
   if the data rate of the stream of data is equal to or less than the data rate threshold value.

5. The method of claim 1, wherein the data rate threshold value is a peak data rate of the communication link.

6. The method of claim 1, further comprising switching from the first RxD state or the second RxD state, to a non-diversity state dependent upon the link quality metrics and a data inactivity time.

7. The method of claim 1,
   wherein the communication link comprises multiple streams of data, and
   wherein the link quality metrics comprise at least one selected from the group consisting of the number of interferers, data rates of the streams of data, a channel rank of multi-input multi-output channels from a serving base station, the signal to interference plus noise ratio (SINR), and a carrier-to-interference ratio (C/I).

8. The method of claim 7, wherein the selectively switching comprises switching from the first RxD state to the second RxD state:
   if the number of interferers is greater than 1;
   if the data rate of a weakest stream of the streams of data is less than a first threshold value;
   if the data rate of a strongest stream of the streams of data is less than a second threshold value; or
   if the channel rank is greater than a third threshold value.

9. The method of claim 7, further comprising switching from the second RxD state to the first RxD state:
   if the number of interferers is less than or equal to 1, the data rate of the strongest stream is greater than a fourth threshold value, and the data rate of the weakest stream is greater than a fifth threshold value.

10. The method of claim 1, wherein the selectively switching comprises switching from the first RxD state to the second RxD state:
    if the number of interferers is greater than 1; or
    if the signal-to-interference-plus-noise ratio is less than the SINR threshold value.

11. An apparatus capable of receive-diversity for a wireless communication network, comprising:
    means for enabling a first receive-diversity (RxD) state utilizing two receive chains for a communication link;
    means for determining link quality metrics corresponding to the communication link;
    means for selectively switching from the first RxD state to a second RxD state utilizing three or more receive chains dependent upon the link quality metrics, such that the energy per bit of the second RxD state is more energy efficient than the energy per bit of the first RxD state; and
    means for switching from the second RxD state to the first RxD state:
       if a number of interferers is less than or equal to 1 and a data rate of a stream of data on the communication link is equal to or greater than a data rate threshold value; or
       if the number of interferers is less than or equal to 1 and a signal-to-interference-plus-noise ratio (SINR) is greater than a SINR threshold value.

12. The apparatus of claim 11,
    wherein the communication link comprises a single stream of data, and
    wherein the link quality metrics comprise at least one selected from the group consisting of the number of interferers, the data rate of the stream of data, the signal-to-interference-plus-noise ratio (SINR), and a carrier-to-interference ratio (C/I).

13. The apparatus of claim 12, wherein the data rate is based on a requested data rate, a predicted data rate, or a measured data rate.

14. The apparatus of claim 11, wherein the means for selectively switching comprises means for switching from the first RxD state to the second RxD state:
    if the number of interferers is greater than 1; or
    if the data rate of the stream of data is equal to or less than the data rate threshold value.

15. The apparatus of claim 11, wherein the data rate threshold value is a peak data rate of the communication link.

16. The apparatus of claim 11, further comprising means for switching from the first RxD state or the second RxD state, to a non-diversity state dependent upon the link quality metrics and a data inactivity time.

17. The apparatus of claim 11,
    wherein the communication link comprises multiple streams of data, and
    wherein the link quality metrics comprise at least one selected from the group consisting of the number of interferers, data rates of the streams of data, a channel rank of multi-input multi-output channels from a serving base station, the signal to interference plus noise ratio (SINR), and a carrier-to-interference ratio (C/I).

18. The apparatus of claim 17, wherein the means for selectively switching comprises means for switching from the first RxD state to the second RxD state:
if the number of interferers is greater than 1;
if the data rate of a weakest stream of the streams of data is less than a first threshold value;
if the data rate of a strongest stream of the streams of data is less than a second threshold value; or
if the channel rank is greater than a third threshold value.

19. The apparatus of claim 17, further comprising means for switching from the second RxD state to the first RxD state:
if the number of interferers is less than or equal to 1, the data rate of the strongest stream is greater than a fourth threshold value, and the data rate of the weakest stream is greater than a fifth threshold value.

20. The apparatus of claim 11, wherein the means for selectively switching comprises means for switching from the first RxD state to the second RxD state:
if the number of interferers is greater than 1; or
if the signal-to-interference-plus-noise ratio (SINR) is less than the SINR threshold value.

21. A computer program product, comprising:
a non-transitory computer readable storage medium comprising code for causing an access terminal to:
enable a first receive-diversity (RxD) state utilizing two receive chains for a communication link;
determine link quality metrics corresponding to the communication link;
selectively switch from the first RxD state to a second RxD state utilizing three or more receive chains dependent upon the link quality metrics, such that the energy per bit of the second RxD state is more energy efficient than the energy per bit of the first RxD state; and
switch from the second RxD state to the first RxD state:
if a number of interferers is less than or equal to 1 and a data rate of a stream of data on the communication link is equal to or greater than a data rate threshold value; or
if the number of interferers is less than or equal to 1 and a signal-to-interference-plus-noise ratio (SINR) is greater than a SINR threshold value.

22. The computer program product of claim 21,
wherein the communication link comprises a single stream of data, and
wherein the link quality metrics comprise at least one selected from the group consisting of the number of interferers, the data rate of the stream of data, the signal-to-interference-plus-noise ratio (SINR), and a carrier-to-interference ratio (C/I).

23. The computer program product of claim 22, wherein the data rate is based on a requested data rate, a predicted data rate, or a measured data rate.

24. The computer program product of claim 21, wherein the computer-readable storage medium further comprises code for causing the access terminal to switch from the first RxD state to the second RxD state:
if the number of interferers is greater than 1; or
if the data rate of the stream of data is equal to or less than the data rate threshold value.

25. The computer program product of claim 21, wherein the data rate threshold value is a peak data rate of the communication link.

26. The computer program product of claim 21, wherein the computer-readable storage medium further comprises code for causing the access terminal to switch from the first RxD state or the second RxD state, to a non-diversity state dependent upon the link quality metrics and a data inactivity time.

27. The computer program product of claim 21,
wherein the communication link comprises multiple streams of data, and
wherein the link quality metrics comprise at least one selected from the group consisting of the number of interferers, data rates of the streams of data, a channel rank of multi-input multi-output channels from a serving base station, the signal to interference plus noise ratio (SINR), and a carrier-to-interference ratio (C/I).

28. The computer program product of claim 27, wherein the computer-readable storage medium further comprises code for causing the access terminal to switch from the first RxD state to the second RxD state:
if the number of interferers is greater than 1;
if the data rate of a weakest stream of the streams of data is less than a first threshold value;
if the data rate of a strongest stream of the streams of data is less than a second threshold value; or
if the channel rank is greater than a third threshold value.

29. The computer program product of claim 27, wherein the computer-readable storage medium further comprises code for causing the access terminal to switch from the second RxD state to the first RxD state:
if the number of interferers is less than or equal to 1, the data rate of the strongest stream is greater than a fourth threshold value, and the data rate of the weakest stream is greater than a fifth threshold value.

30. The computer program product of claim 21, wherein the computer-readable storage medium further comprises code for causing the access terminal to switch from the first RxD state to the second RxD state:
if the number of interferers is greater than 1; or
if the signal-to-interference-plus-noise ratio (SINR) is less than the SINR threshold value.

31. An apparatus capable of receive-diversity for a wireless communication network, comprising:
at least one processor;
a communication interface coupled to the at least one processor; and
a memory coupled to the at least one processor,
wherein the at least one processor is configured to:
enable a first receive-diversity (RxD) state utilizing two receive chains for a communication link;
determine link quality metrics corresponding to the communication link;
selectively switch from the first RxD state to a second RxD state utilizing three or more receive chains dependent upon the link quality metrics, such that the energy per bit of the second RxD state is more energy efficient than the energy per bit of the first RxD state; and
switch from the second RxD state to the first RxD state:
if a number of interferers is less than or equal to 1 and a data rate of a stream of data on the communication link is equal to or greater than a data rate threshold value; or
if the number of interferers is less than or equal to 1 and a signal-to-interference-plus-noise ratio (SINR) is greater than a SINR threshold value.

32. The apparatus of claim 31,
wherein the communication link comprises a single stream of data, and
wherein the link quality metrics comprise at least one selected from the group consisting of the number of interferers, the data rate of the stream of data, the signal-to-interference-plus-noise ratio (SINR), and a carrier-to-interference ratio (C/I).

33. The apparatus of claim 32, wherein the data rate is based on a requested data rate, a predicted data rate, or a measured data rate.

34. The apparatus of claim 31, wherein the at least one processor is further configured to switch from the first RxD state to the second RxD state:
if the number of interferers is greater than 1; or
if the data rate of the stream of data is equal to or less than the data rate threshold value.

35. The apparatus of claim 31, wherein the data rate threshold value is based on a peak data rate.

36. The apparatus of claim 31, wherein the at least one processor is further configured to switch from the first RxD state or the second RxD state, to a non-diversity state dependent upon the link quality metrics and a data inactivity time.

37. The apparatus of claim 31,
wherein the communication link comprises multiple streams of data, and
wherein the link quality metrics comprise at least one selected from the group consisting of the number of interferers, data rates of the streams of data, a channel rank of multi-input multi-output channels from a serving base station, the signal to interference plus noise ratio (SINR), and a carrier-to-interference ratio (C/I).

38. The apparatus of claim 37, wherein the at least one processor is further configured to switch from the first RxD state to the second RxD state:
if the number of interferers is greater than 1;
if the data rate of a weakest stream of the streams of data is less than a first threshold value;
if the data rate of a strongest stream of the streams of data is less than a second threshold value; or
if the channel rank is greater than a third threshold value.

39. The apparatus of claim 37, wherein the at least one processor is further configured to switch from the second RxD state to the first RxD state:
if the number of interferers is less than or equal to 1, the data rate of the strongest stream is greater than a fourth threshold value, and the data rate of the weakest stream is greater than a fifth threshold value.

40. The apparatus of claim 31, wherein the at least one processor is further configured to switch from the first RxD state to the second RxD state:
if the number of interferers is greater than 1; or
if the signal-to-interference-plus-noise ratio (SINR) is less than the SINR threshold value.

\* \* \* \* \*